United States Patent
Goldberg et al.

[11] Patent Number: 5,873,966
[45] Date of Patent: Feb. 23, 1999

[54] MAGNETIC SPLICE DETECTION SYSTEM

[75] Inventors: Ira B. Goldberg, Thousand Oaks, Calif.; David L. Mays, Woodstock, Ga.

[73] Assignee: Reliance Electric Industrial Company, Cleveland, Ohio

[21] Appl. No.: 950,259

[22] Filed: Oct. 14, 1997

[51] Int. Cl.$^6$ ........................................... B32B 31/00
[52] U.S. Cl. ..................... 156/64; 156/157; 156/361; 156/502
[58] Field of Search ................. 156/64, 157, 159, 156/350, 353, 361, 502, 504; 101/491

[56] References Cited

U.S. PATENT DOCUMENTS

| | | | |
|---|---|---|---|
| 4,387,614 | 6/1983 | Evans | 83/38 |
| 4,415,978 | 11/1983 | Craemer et al. | 364/475 |
| 4,785,750 | 11/1988 | Best | 112/262.1 |
| 4,792,392 | 12/1988 | Belgian | 209/3.3 |
| 5,255,055 | 10/1993 | Mahoney | 355/208 |
| 5,458,062 | 10/1995 | Goldberg et al. | 101/485 |
| 5,512,125 | 4/1996 | Momot et al. | 156/353 |

*Primary Examiner*—James Engel
*Attorney, Agent, or Firm*—David G. Luettgen; John M. Miller; John J. Horn

[57] ABSTRACT

A method and system for manufacturing units of production enables the location of a splice to be accurately determined, so that only the unit of production containing the splice can be rejected without requiring additional units of production which are entirely free of defects to also be rejected. According to the method, first and second webs of material are spliced together so as to create a splice. The splice is marked with a magnetic marker. After the units of production are assembled, including a unit of production which contains the splice, the magnetic marker is magnetized. The magnetizing step occurs after the assembling step so that the orientation of the magnetic field remains parallel to the sensing direction until the magnetic field is detected. The magnetic marker is detected with a detector which has a plurality of closely spaced magnetic sensors. Based on the detecting step, the unit of production containing the splice is rejected and units of production which do not contain the splice are packaged.

22 Claims, 4 Drawing Sheets

MAGNETIC SPLICE DETECTION SYSTEM

BACKGROUND OF THE INVENTION

1. Field of the Invention

This invention relates to splice detection systems, and more particularly relates to a splice detection system in which a magnetic marker is used to locate a splice between two sections of material. The invention is particularly useful for continuous web manufacturing processes.

2. Description of Related Art

During the manufacturing of many different types of products, it is often necessary to splice together different sections of a material supply coming from a continuous supply source. Such products include, but are not limited to, sheet insulation, circuit boards, disposable diapers, gaskets, and various types of paper products. Ordinarily, in order to allow the production equipment to run continuously, when any given supply roll of material is exhausted, a new supply roll is spliced in immediately without stopping production. The result is that the machines are constantly running and that some of the finished units of production (e.g., individual disposable diapers) contain a splice where a new roll of material was spliced to an old roll of material. These units of production are considered defective and are not sold to consumers. Therefore, near the end of the production line, there must be a way to locate the splices so that units of production which contain the splices may be rejected.

Currently, splices are located using a timing algorithm which takes into account the initial location of the splice at an initial point in time and the speed of the splice through the production line. Using this information, the arrival time of the splice at a rejection mechanism is estimated, and units of production which are likely to have a splice contained therein are rejected.

The disadvantage of this approach is that there is a large amount of error in predicting the arrival time of the splice at the rejection mechanism. The error arises because the material can stretch and because there can be slippage between the rollers which drive the movement of the material and the material itself. This stretching and slipping causes the splice to travel along the production line at a speed which is different than the assumed average speed of the production line. Therefore, as a result of this error, many additional (e.g., twenty to fifty units of production) are currently rejected for each splice in order to ensure that the one unit of production which actually contains the splice is also rejected. Disadvantageously, therefore, the error in predicting the arrival time of the splice at the rejection mechanism results in a significant amount of waste.

SUMMARY OF THE INVENTION

In order to overcome these drawbacks, the present invention provides a method of detecting a splice comprising the steps of marking the splice with a marker and detecting the marker. In a variation, the present invention provides a method of detecting a point which moves along a production line, comprising the steps of marking the point with a magnetic marker and detecting the magnetic marker.

According to one aspect of the invention, a method of manufacturing units of production includes dispensing a first web of material from a first source. When the first source is depleted, a second web of material from a second source is spliced to the first web to replace the first source, and thereafter the second web of material is dispensed from the second source. The splicing step further includes the steps of placing an initial section of the second web near the end of the first web so as to create a splice, and placing a magnetic marker on at least one of the first web and the second web near the splice.

After the units of production are assembled, including a unit of production which contains the splice, the magnetic marker is magnetized. The magnetizing step includes the step of inducing a magnetic field in the unit of production which contains the splice which is oriented parallel to a sensing direction. The magnetizing step preferably occurs after the assembling step such that the orientation of the magnetic field remains parallel to the sensing direction until the magnetic field is detected.

The magnetic marker is detected with a detector which has a plurality of closely spaced magnetic sensors. The plurality of closely spaced magnetic sensors are distributed substantially perpendicularly to the direction of travel of the units of production. Based on the detecting step, the unit of production containing the splice is rejected and units of production which do not contain the splice are packaged.

According to another aspect of the invention, a system for manufacturing units of production comprises a first web source, a second web source, an assembly mechanism, a magnetic marker, a magnetizer, a detector, a packaging mechanism, and a rejection mechanism. The first web source supplies a first web used to form a first unit of production, and the second web source supplies a second web used to form a second unit of production after the first web source is depleted.

The assembly mechanism combines the first web with a plurality of additional webs to form the first unit of production, and combines the second web with a plurality of additional webs to form the second unit of production. The assembly mechanism also combines both the first web and the second web with a plurality of additional webs to form a third unit of production containing a splice at which the first web is spliced to the second web.

The magnetic marker marks the splice and is magnetized by a magnetizer when the magnetic marker passes through a magnetic field created by the magnetizer. The detector detects the magnetic marker, thereby detecting the third unit of production containing the splice. The packaging mechanism packages the first and second units of production, and the rejection mechanism rejects the third unit of production such that the third unit of production is not packaged with the first and second units of production.

Advantageously, the invention enables the location of a splice in a unit of production to be accurately determined. This allows only the unit of production containing the splice to be rejected, without having to reject other units of production which are entirely free of defects. Waste during production therefore is reduced.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals reference like parts throughout, and in which.

DESCRIPTION OF THE PREFERRED EMBODIMENTS

Figure 1:
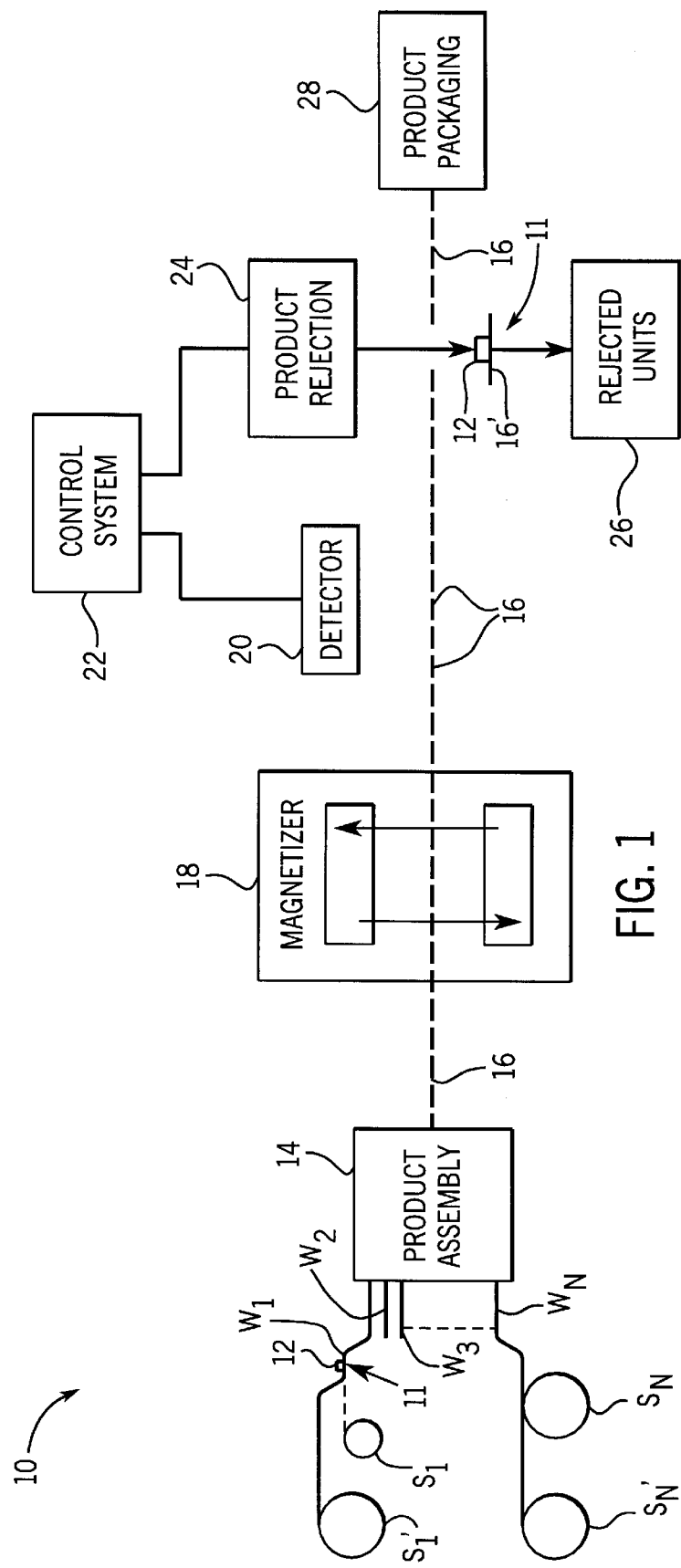
FIG. 1 is a simplified diagrammatic representation of a production line which utilizes one embodiment of a magnetic splice detection system according to the present invention.

Referring now to FIG. 1, an exemplary system 10 which utilizes the present invention is illustrated. The system 10 is a production system which is used to assemble units of production, such as disposable diapers. The units of production are formed of N layers of material and, to this end, the production line 10 comprises a plurality of sources $S_1$ to $S_N$. The sources $S_1$ to $S_N$ are rolls of material which supply webs $W_1$ to $W_N$, respectively.

As illustrated, the source $S_1$ has been depleted. Accordingly, a web $W_1'$ from a new source $S_1'$ is spliced to the end of the web $W_1$ from the old source $S_1$ at a splice 11. (Similarly, FIG. 1 also illustrates another source $S_N'$ is shown which will eventually be spliced to the source $S_N$ when the source $S_N$ is depleted.) The sources $S_1$ and $S_1'$ are typically spliced together manually by an operator whose responsibility it is to monitor the sources $S_1$ to $S_N$ and to splice in new sources as necessary. To splice the two rolls of material together, the operator lays the new web $W_1'$ across the old web $W_1$ and places a strip of tape across the two layers. Alternatively, the two rolls of material could be automatically spliced together in the same manner. In either event, the result is that the end of the old web $W_1$ pulls the initial section of the new web $W_1'$ through the production line 10.

Pursuant to the invention, the strip of tape implements a magnetic marker 12 which marks the splice 11 between the old source $S_1$ and the new source $S_1'$. (For clarity, the size of the magnetic marker 12 is exaggerated in FIG. 1.) As detailed below, the magnetic marker 12 contains magnetic labels 30 (FIGS. 2A and 2B) which, when magnetized, create a detectable magnetic field. The position of the magnetic marker 12 with respect to the splice 11 is known; therefore, the magnetic marker 12 enables the splice 11 to be accurately located.

The webs $W_1$ to WN enter a product assembly stage 14. In the product assembly stage 14, the individual layers of material are combined, cut, folded, and so on, as needed to produce a finished product. The specific aspects of the product assembly stage 14 are not detailed since these aspects could be almost anything, depending on what is produced. The output of the product assembly stage 14 is individual units of production 16.

Each unit of production 16 which is output from the product assembly stage 14 passes through the magnetizer 18. However, although each unit of production 16 passes through the magnetizer 18, only a unit of production 16' contains a splice 11 and therefore only the unit of production 16' contains a magnetic marker 12 therein. Thus, only the unit of production 16' creates a magnetic field which is detectable by a downstream detector 20 (used to detect the magnetic marker 12), indicating that the unit of production 16' has the splice 11 contained therein and should be rejected.

The magnetic marker 12 could be magnetized earlier in the production process, for example, the magnetic markers could be pre-magnetized or could be magnetized during the product assembly stage 14. This approach is not preferred, however, because it may not result in the magnetic marker 12 having a magnetic field which is optimally oriented for purposes of detection. If the magnetic marker 12 is magnetized before the product assembly stage 14 is complete, it is difficult to control the final orientation of the magnetic field. For example, the magnetic marker 12 may be folded on top of itself during the product assembly stage 14, causing the magnetic field from the folded top half of the magnetic marker 12 and the magnetic field from the folded bottom half of the magnetic marker 12 to significantly reduce the magnetic field where detection occurs, compared to a flat label. Preferably, therefore, the magnetic marker 12 is magnetized after the product assembly stage 14 is complete. With this approach, the magnetic marker 12 does not change orientation between magnetization and detection. As a result, the orientation of the magnetic field of the magnetic marker 12 can be controlled and can be optimized for purposes of detection. (This is the case even though the orientation of the magnetic field with respect to the magnetic marker 12 varies due to the variations in the orientation of the magnetic marker 12 with respect to the magnetizer 18.) On the other hand, although the magnetic marker 12 should be magnetized after the product assembly stage 14, the magnetic marker 12 should not be magnetized so closely to the detector 20 that the field from the magnetizer 18 is detected by the detector 20.

The sensors in the detector 20 can be any type of magnetic field sensor, such as a fluxgate magnetometer, magnetoresistive sensor, or Hall effect sensor. Hall effect sensors are preferred, however, because they are relatively inexpensive, are small so that they can be placed close to the web where the magnetic field from the label is strong, and have a sufficient response time in view of the rapid movement of the magnetic marker 12 along the production line 10. Although not shown, additional sensors could be placed below the web, so that the magnetic field may extend a smaller distance and therefore smaller labels may be used.

Upon detecting a magnetic field, the detector 20 notifies a control system 22. The control system 22 responds by causing a product rejection mechanism 24 to reject the unit of production 16' having the splice 11 contained therein. The unit of production 16' therefore joins other rejected units at a stage 26, instead of continuing along the production line 10 and being packaged with other units at a product packaging stage 28. Also, since the magnetic marker 12 is preferably placed at the location of the splice, the magnetic marker 12 is removed from the production line when the unit of production 16' is rejected (see FIG. 1) and is not packaged with the remaining units of production 16.

Advantageously, the magnetic marker permits the splice to be detected with a high degree of accuracy, such that it is usually only necessary to reject one unit of production. In some cases, when the magnetic marker 12 is cut in half during the product assembly stage 14 and is distributed over two units of production, it is necessary to reject two units of production. In both cases, however, the number of units of production which are rejected in order to eliminate the splice 11 is drastically reduced compared to conventional processes.

Figure 2B:
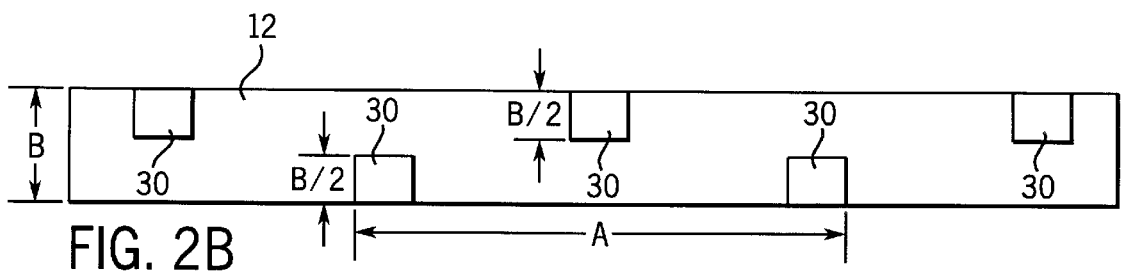
FIG. 2B is a simplified diagrammatic representation of the magnetic marker illustrated in FIG. 2A.
Figure 2A:
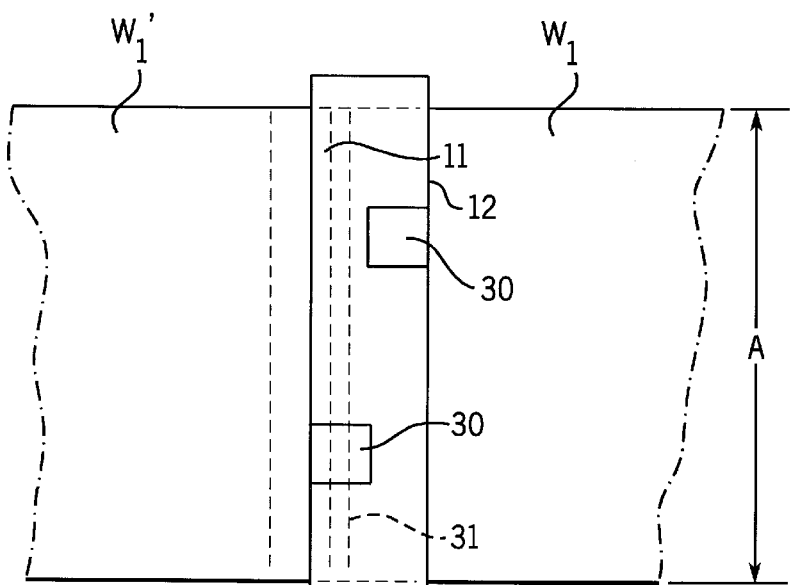
FIG. 2A is a simplified diagrammatic representation of a new web spliced to an old web using a magnetic marker.

Referring now to FIGS. 2A–2B, a preferred embodiment of the magnetic marker 12 is illustrated. FIG. 2A illustrates in greater detail the magnetic marker 12 which is laid across the splice 11, and also illustrates the two webs $W_1$ and $W_1'$ which are joined at the splice 11 by the magnetic marker 12. FIG. 2B illustrates a continuous length of material (e.g., of tape) from which a plurality of magnetic markers 12 are formed.

The magnetic marker 12 is in the form of an adhesive tape and includes a plurality of magnetic labels 30 which are made of a magnetic material. The magnetic labels 30 do not cover the entire surface area of the magnetic marker 12, but rather are staggered along the both the width and length of the magnetic marker 12. This arrangement is preferred because the magnetic material adds cost to the magnetic marker 12 and, therefore, it is desirable to use as little magnetic material as possible for reasons of cost. Nevertheless, the magnetic marker 12 still provides good detection characteristics because the detector 20 is constructed using a plurality of closely spaced sensors which extend across the width A of the webs $W_1$ and $W_1'$, and have a spacing equal to or smaller than the dimension of the label in the direction parallel to the splice.

As is typical, the tape comes on a roll, and the operator tears off lengths of tape as needed in order to splice two sources together. Therefore, the location of the magnetic labels 30 along the length of the magnetic marker 12 varies for each magnetic marker. In order to assure that at least two full magnetic labels are disposed on each splice, the magnetic marker 12 is configured as illustrated in FIG. 2B, in which three magnetic labels are contained within the width A of the webs $W_1$ and W'. Thus, no matter where the magnetic marker 12 is cut as it is removed from its supply roll, the magnetic marker 12 always comprises at least two magnetic labels 30 (assuming that the magnetic marker 12 is approximately the width of the webs $W_1$ and $W_1'$ or slightly longer). Moreover, in order to ensure that there is always at least one magnetic label 30 which remains uncut after product assembly, the magnetic labels 30 are staggered on either side of the width of the magnetic marker 12 (as previously mentioned). As a result, as illustrated in FIG. 2A, if the unit of production is cut along a line 31, one magnetic label 30 is cut but the other magnetic label 30 remains intact.

In situations where one magnetic label 30 is left unreadable, it is nevertheless possible to reject the unit of production containing the unreadable label (in FIG. 2A, the first unit of production formed from the new web $W_1'$). This is achieved through the inclusion of an appropriate control rule in the control system 22: For example, if a magnetic label 30 is detected within a predetermined distance of the edge of the unit of production, then the next unit of production is also rejected.

The magnetic label 30 is in the shape of a rectangle. A rectangular shape for the magnetic label 30 is preferred because of its superior magnetic characteristics. The rectangle, and more specifically the square, has sides that are about one-half the width B of the magnetic marker 12.

Of course, it should be noted that the magnetic marker 12 illustrated in FIGS. 2A–2B is merely one possible embodiment, and that numerous other configurations are also possible. The magnetic marker 12 could also take other configurations, both in terms of composition and in terms of geometry. For example, a magnetic ink could be used instead of the magnetic labels 30. Additionally, a magnetic marker 12 consisting of only a single small magnetic label 30 could be used. Also, rather than extending only half the width of the magnetic marker, the magnetic labels could extend the full width of the magnetic marker. (In this case, only one label would need to be applied per splice.) Additionally, instead of using a magnetic marker in which the final location of the magnetic label along the splice is essentially random, a magnetic marker could be used in which the location of the magnetic label along the splice is known. This would allow fewer sensors to be used. Numerous other configurations are also possible.

Figure 3:
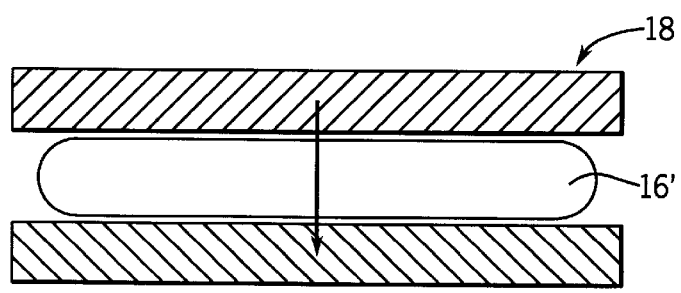
FIG. 3 is a simplified diagrammatic representation of a sectional front view of a magnetizer used in the system illustrated in FIG. 1.

Referring now to FIG. 3, a simplified diagram showing the operation of the magnetizer 18 is illustrated. The magnetizer 18 illustrated in FIG. 3 is a generic representation of the various preferred embodiments of the magnetizer illustrated in FIGS. 4A–5B.

As illustrated in FIG. 3, the magnetizer 18 is arranged such that there is one pole above the unit of production 16' and one pole below the unit of production 16'. As a result, the magnetic field created by the magnetizer 18 forms a loop which passes through the unit of production 16', and the unit of production 16' is not merely on the periphery of a magnetic field. This maximizes the extent to which the magnetic label is magnetized. Additionally, the magnetic field created by the magnetizer 18 passes through the unit of production 16' in a direction which is perpendicular to the direction of travel (into the page) of the unit of production 16'. (FIG. 3 is a front view of a magnetizer; the folded unit of production 16' is traveling into the page.) As a result, the magnetic field induced in the magnetic labels 30 is parallel to the sensing direction. Finally, the width of the magnetizer is wider than the width (approximately ⅓A) of the unit of production 16' (which has been folded in thirds) on the conveyor belt. As a result, the magnetic label 30 is guaranteed to be within the strong field region of the magnetizer 18. (The magnetic field of the magnetizer decreases slightly near the edges.) In short, therefore, the arrangement illustrated in FIG. 3 ensures that the magnetic field induced in the magnetic labels 30 is properly oriented and is strong enough to be detected.

As detailed below, the magnetizer 18 may be constructed using either permanent magnets or electromagnets. The advantages of permanent magnet magnetizers are that they are inexpensive, compact, highly reliable (because they operate without a power supply and electronic controls), and formed from components readily available. The advantages of electromagnet magnetizers are that they have less of a tendency to attract foreign objects and can be turned off in order to avoid interfering with servicing the production line.

Figure 4A:
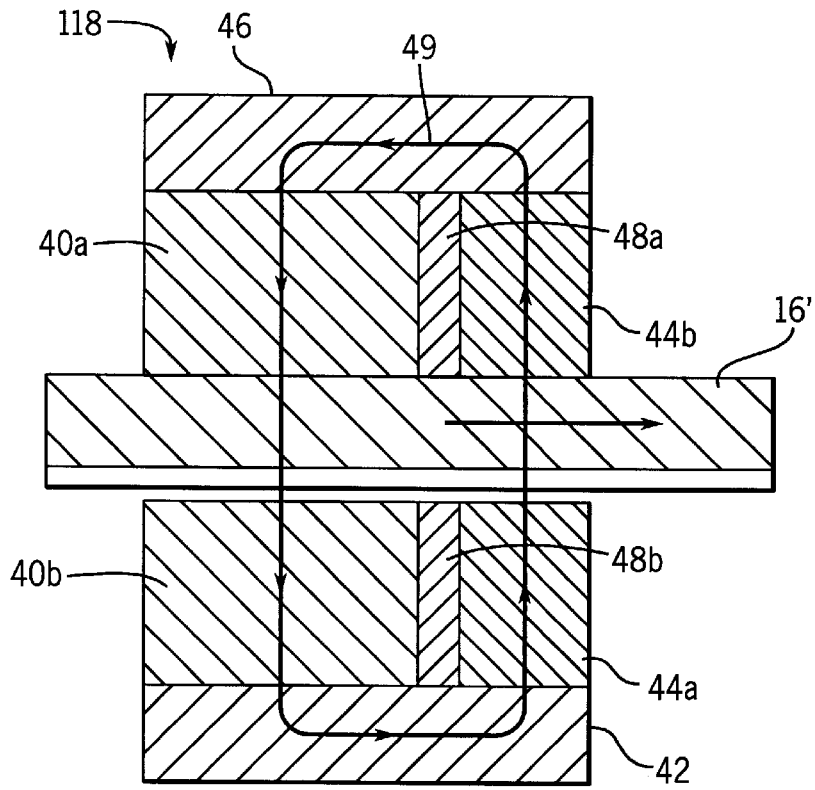
FIG. 4A is a simplified diagrammatic sectional side view of a magnetizer which uses first and second permanent magnets.
Figure 4B:
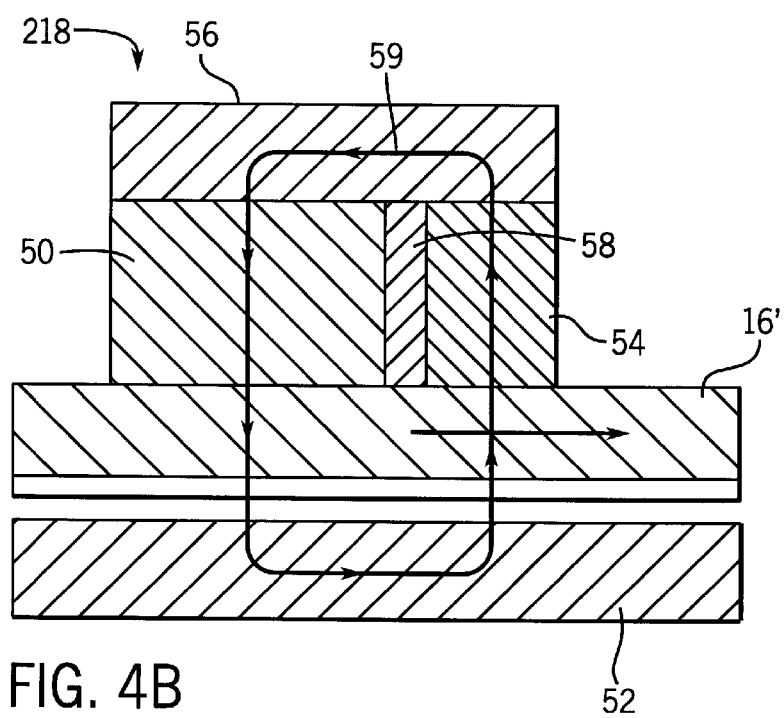
FIG. 4B is a simplified diagrammatic sectional side view of a magnetizer which uses a permanent magnet in combination with a steel base.

Referring now to FIGS. 4A and 4B, two magnetizer arrangements which incorporate permanent magnets are illustrated. Referring first to FIG. 4A, a magnetizer 118 comprises a permanent magnet 40a, a permanent magnet 40b, a soft iron platen 42, a soft iron section 44a, a soft iron section 44b and a soft iron section 46. Non-magnetic spacers 48a and 48b are used to separate the permanent magnets 40a and 40b from the soft iron sections 44a and 44b so that a magnetic flux loop 49 passes through the unit of production 16', as illustrated, rather than forming two separate flux loops above and below the unit of production 16'. A strong permanent magnet, such as neodymium-iron-boron, should be used so that a sufficiently strong field is created.

The cross sections of the soft iron sections 44a and 44b is smaller than the cross sections of the permanent magnets 40a and 40b. As a result, the magnetization of the soft iron sections 44a and 44b is greater than the magnetization of the permanent magnets 40a and 40b. Accordingly, the magnetizer 118 is arranged so that the magnetic field through the unit of production 16' is strongest as the unit of production 16' exits the magnetizer 118. As a result, the magnetic labels 30 are as strongly magnetized as possible.

Referring now to FIG. 4B, a magnetizer 218 is illustrated in which the permanent magnet 40b, the soft iron platen 42 and the soft iron section 44a of FIG. 4A have been replaced with a steel base 52. The steel base 52, in combination with a soft iron section 54, a soft iron section 56, and a permanent magnet 50, forms a magnetic circuit which directs a magnetic flux loop 59 through the unit of production 16'. A non-magnetic spacer 58 ensures that the magnetic flux loop 59 is directed through the unit of production 16'. The advantage of the magnetizer 118 (FIG. 4A) over the magnetizer 218 (FIG. 4B) is that the dual permanent magnets 40a and 40b create a stronger field than the permanent magnet 50, and therefore are more likely to sufficiently magnetize the magnetic label 30. The advantage of the magnetizer 218 (FIG. 4B) over the magnetizer 118 (FIG. 4A) is that the magnetizer 218 is simpler and less expensive and can be installed without modifying the assembly lines with steel plattens for supporting the web.

Figure 5A:
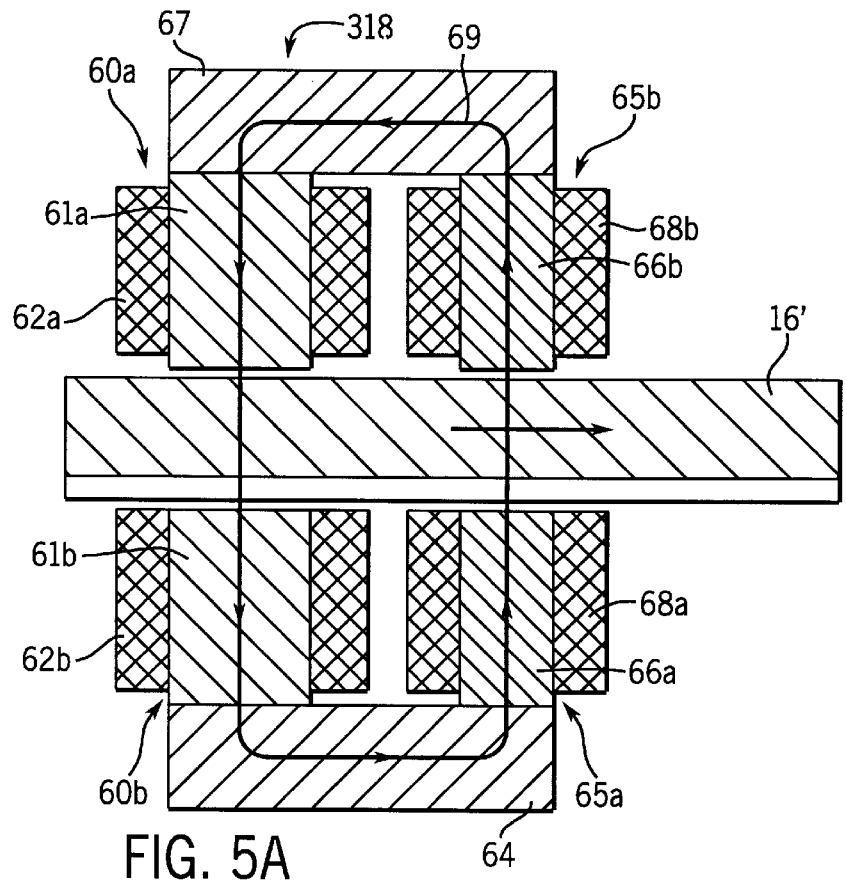
FIG. 5A is a simplified diagrammatic sectional side view of a magnetizer which uses first and second electromagnets.
Figure 5B:
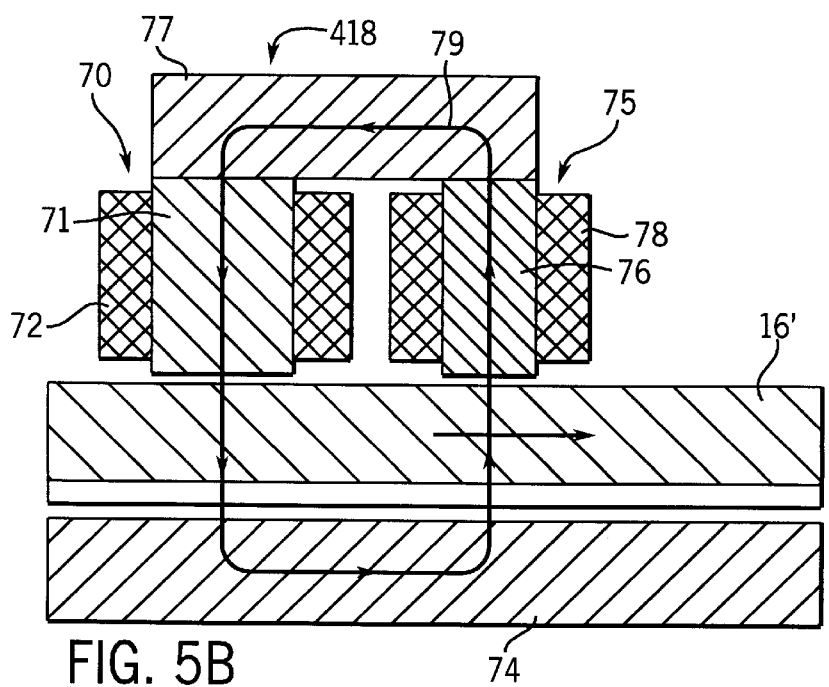
FIG. 5B is a simplified diagrammatic sectional side view of a magnetizer which uses an electromagnet in conjunction with a steel base.

Referring now to FIGS. 5A and 5B, two magnetizer arrangements which incorporate electromagnets are illustrated. Referring first to FIG. 5A, a magnetizer 318 comprises electromagnets 60a and 60b which are formed of soft iron sections 61a and 61b surrounded by coils 62a and 62b, respectively. The magnetizer 318 also comprises permanent magnets 65a and 65b formed of soft iron sections 66a and 66b surrounded by coils 68a and 68b, respectively. Finally, the magnetizer 318 comprises soft iron sections 64 and 67 which complete a magnetic circuit such that a magnetic flux loop 69 passes through the unit of production 16'. Again, in the magnetizer 318, the cross section of the soft iron sections 66a and 66b is smaller than the cross section of the soft iron sections 61a and 61b so that the magnetic field through the unit of production 16' is strongest as the unit of production 16' exits the magnetizer 318.

Referring now to Fig. 5B, a fourth embodiment 418 of the magnetizer is illustrated. The magnetizer 418 comprises an electromagnet 71 formed of a soft iron section 70 and a coil 72, and an electromagnet 75 formed of a soft iron section 76 and a coil 78. The magnetizer 418 also includes a steel platen 74 and a soft iron section 77. The magnetic field created by the electromagnets 71 and 75 forms a magnetic flux loop 79 which passes through the unit of production 16'.

Advantageously, the invention allows the location of a splice in a unit of production or other product to be accurately determined. This allows only the product containing the splice to be rejected, without having to reject other products which are entirely free of defects. Therefore, waste during production is reduced.

Many other changes and modifications may be made to the present invention without departing from the spirit thereof. For example, the present invention could be used in conjunction with other types of markers in addition to magnetic markers. The scope of these changes will become apparent from the appended claims.

We claim:

1. A method of detecting a splice, comprising:
   marking said splice with a marker, said marker being a magnetic marker and comprising a magnetic label;
   detecting said marker by detecting a magnetic field created by said magnetic labels;
   rejecting a unit of production which moves along a production line and which contains said splice; and
   packaging a plurality of additional units of production which do not contain said splice.

2. A method of detecting a location of a splice which moves along a production line, comprising:
   splicing an end section of a first supply to an initial section of a second supply so as to create said splice;
   marking said splice with a magnetic marker;
   assembling a unit of production which contains said splice;
   assembling a first plurality of additional units of production using said first supply and a second plurality of additional units of production using said second supply, wherein said first and second pluralities of additional units of production do not contain said splice;
   detecting said magnetic marker;
   rejecting said unit of production which contains said splice based on said detecting step; and
   packaging said first and second pluralities of additional units of production which do not contain said splice.

3. A method according to claim 2, wherein said unit of production is a disposable diaper, wherein said first plurality of additional units of production is a first plurality of additional disposable diapers, and wherein said second plurality of additional units of production is a second plurality of additional disposable diapers.

4. A method according to claim 2, wherein said splicing step and said marking step are performed at the same time.

5. A method according to claim 2, wherein said magnetic marker is formed of adhesive tape which connects said end section of said first supply to said initial section of said second supply.

6. A method according to claim 5, wherein said magnetic marker comprises a plurality of magnetic labels which are staggered along the both the width and length of said adhesive tape.

7. A method according to claim 2, further comprising magnetizing said magnetic marker, said magnetizing step being performed after said unit of production assembling step.

8. A method according to claim 2 wherein, during said marking step, said magnetic marker is placed at said location of said splice, such that said magnetic marker is removed from said production line when said unit of production which contains said splice is rejected during said rejecting step.

9. A system for manufacturing units of production, comprising:
   a first web source, said first web source supplying a first web used to form a first unit of production;
   a second web source, said second web source supplying a second web used to form a second unit of production after said first web source is depleted;
   a unit of production assembly mechanism, said unit of production assembly mechanism combining said first web with a plurality of additional webs to form said first unit of production, said unit of production assembly mechanism combining said second web with said plurality of additional webs to form said second unit of production, and said unit of production assembly mechanism combining both said first web and said second web with said plurality of additional webs to form a third unit of production that contains a splice at which said first web is spliced to said second web;

a magnetic marker, said magnetic marker being attached to at least one of said first web and said second web near said splice, said magnetic marker marking said splice;

a magnetizer, said magnetizer generating a magnetic field which magnetizes said magnetic marker when said magnetic marker passes through said magnetic field created by said magnetizer;

a detector, said detector detecting said magnetic marker and thereby detecting said splice;

a packaging mechanism, said packaging mechanism packaging said first and second units of production; and a rejection mechanism, said rejection mechanism rejecting said third unit of production such that said third unit of production is not packaged with said first and second units of production.

10. A system according to claim 9, wherein said magnetic marker is formed of adhesive tape which connects said first web of said first source to said second web of said second source.

11. A system according to claim 10, wherein said magnetic marker comprises a plurality of magnetic labels which are staggered along the both the width and length of said adhesive tape, each of said plurality of magnetic labels extending approximately half the width of said adhesive tape.

12. A system according to claim 11, wherein a length of said adhesive tape approximately equal to a width of said web of said first roll of material contains three magnetic labels, said length of adhesive tape having a first one of said three magnetic labels disposed at one end, a second one of said three magnetic labels disposed at an opposite end, and a third one of said three magnetic labels disposed in the middle of said length of adhesive tape.

13. A system according to claim 9, wherein said magnetizer is disposed between said assembly mechanism and said detector along a production line formed by said system.

14. A system according to claim 9, wherein said detector comprises a plurality of closely spaced magnetic sensors, said plurality of closely spaced magnetic sensors being distributed substantially perpendicularly to a direction of travel of said first, second and third units of production.

15. A system according to claim 9, wherein said first, second and third units of production are all disposable diapers.

16. A system according to claim 9, wherein said magnetizer comprises an entrance and an exit, and wherein the strength of a magnetic field created by said magnetizer is stronger at said exit than at said entrance.

17. A system according to claim 9, wherein said magnetizer comprises a permanent magnet and a plurality of sections of magnetic material, said permanent magnet and said plurality of sections of magnetic material generating a flux loop which passes through said first, second and third units of production as said first, second and third units of production pass through said magnetizer.

18. A system according to claim 9, wherein said magnetizer comprises first and second permanent magnets and a plurality of sections of magnetic material, said first and second permanent magnets and said plurality of sections of magnetic material generating a flux loop which passes through said first, second and third units of production as said first, second and third units of production pass through said magnetizer.

19. A system according to claim 9, wherein said magnetizer comprises an electromagnet and a plurality of sections of magnetic material, said electromagnet and said plurality of sections of magnetic material generating a flux loop which passes through said first, second and third units of production as said first, second and third units of production pass through said magnetizer.

20. A system according to claim 9, wherein said magnetizer comprises a first and second electromagnets and a plurality of sections of magnetic material, said first and second electromagnets and said plurality of sections of magnetic material generating a flux loop which passes through said first, second and third units of production as said first, second and third units of production pass through said magnetizer.

21. A method of manufacturing units of production, the method comprising the steps of dispensing a first web of material from a first source;

splicing a second web of material from a second source to said first web to replace said first source when said first source is depleted, and thereafter dispensing said second web of material from said second source, said splicing step including the steps of placing an initial section of said second web near the end of said first web so as to create a splice, and placing a magnetic marker on at least one of said first web and said second web near said splice;

assembling said units of production, including the step of assembling a unit of production which contains said splice;

magnetizing said magnetic marker, said magnetizing step inducing a magnetic field in said unit of production containing said splice which is oriented parallel to a sensing direction, said magnetizing step occurring after said assembling step such that the orientation of said magnetic field remains parallel to said sensing direction until said magnetic field is detected;

detecting said magnetic marker with a detector, said detector having a plurality of closely spaced magnetic sensors, said plurality of closely spaced magnetic sensors being distributed substantially perpendicularly to the direction of travel of said units of production; and based on said detecting step, rejecting said unit of production containing said splice and packaging units of production which do not contain said splice.

22. A method according to claim 21, wherein said units of production are disposable diapers.

* * * * *